United States Patent [19]
Hoffman et al.

[11] Patent Number: 5,294,050
[45] Date of Patent: Mar. 15, 1994

[54] INSTALLER CLIMATE CONTROL SYSTEM

[75] Inventors: Jonathan H. Hoffman, Flanders, N.J.; Gilbert I. Starr, New Rochelle, N.Y.

[73] Assignee: Interdynamics, Inc., Brooklyn, N.Y.

[21] Appl. No.: 940,431

[22] Filed: Sep. 4, 1992

[51] Int. Cl.5 .............................................. G05D 23/00
[52] U.S. Cl. ...................................... 237/2 A; 165/39; 237/12.3.A; 237/12.3 B
[58] Field of Search ............. 237/2 A, 12.3 A, 12.3 B, 237/12.3 C, 12.3 R; 165/39, 58, 59, 27; 236/91 F

[56] References Cited
U.S. PATENT DOCUMENTS

4,411,385 10/1983 Lamkewitz ........................ 237/2 A
4,974,664 12/1990 Glennon et al. ................... 237/2 A
5,156,204 10/1992 Doi .................................... 237/2 A Primary Examiner—Henry A. Bennet
Attorney, Agent, or Firm—Henry R. Lerner

[57] ABSTRACT

A universally installable climate control system for aftermarket installation in a motor vehicle which includes a heater valve which is controlled by the system and is connected in the supply line to the heater core of the originally installed heater/air conditioner. Additionally, a closed loop climate control system is employed which renders the system transparent to the type of motor vehicle in which it is installed, since the closed loop system ensures that a desired passenger compartment temperature is achieved substantially independent of the operating characteristics of the motor vehicle.

18 Claims, 4 Drawing Sheets

INSTALLER CLIMATE CONTROL SYSTEM

BACKGROUND OF THE INVENTION

This invention relates to the provision of an after-market Climate Control system for use in motor vehicles.

Climate Control systems are increasingly popular throughout the world. Many new automobiles are equipped with such Climate Control systems, and the cost of such systems to the automobile owner can be quite high. There are also many existing automobiles and other motor vehicles world-wide having air conditioning and heating units without a Climate Control system. A Climate Control system, as generally understood, allows the driver to set a desired cabin temperature. The Climate Control system operates to maintain that temperature regardless of the ambient temperature.

Because of the significant differences between different manufacturers' heating and air conditioning systems, the ability to provide an after-market Climate Control system has been materially impaired. Whenever such prior Climate Control after-market systems have been attempted, these were generally very expensive, were tailored to the specific automobile systems, and the cost of installation of such systems is also prohibitive. Further, such after-market systems are not able to be installed in different automobile systems, and this lack of universality materially inhibits the adoption and use of such systems.

An object of the present invention is to provide a universal after-market Climate Control system, hereinafter to be referred to as the INSTALLER CLIMATE CONTROL SYSTEM. That is the title which will be applied to this invention, and which describes the system of the present invention in which the Climate Control system may be employed in any motor vehicle having pre-existing heating and air conditioning systems.

Another object of this invention is to provide a Climate Control Installer Unit which may be easily installed by skilled personnel in a fairly efficient and economical manner.

Another object of this invention is to provide such an INSTALLER CLIMATE CONTROL SYSTEM of wide scale use and application, and which will be economical to manufacture, build and install.

Another object of this invention is to provide improved Climate Control features enhancing the operation of the system, in order to maximize passenger comfort.

Other objects, advantages and features of this invention will become more apparent from the following description.

SUMMARY OF THE INVENTION

The device is a closed loop climate control which may be universally installed as an aftermarket accessory in any water cooled automobile, van, truck, etc.

The system comprises five major assemblies as follows:

1) Control Module. This compact unit is presently offered in four configurations (vertical/horizontal dashmount, DIN style, and CB mic style) to permit the greatest possible flexibility in mounting within easy view and reach of the vehicle driver. Common mounting areas are dashboard, center console, or driver's door panel.

The control module contains a liquid crystal display which communicates system and operational status and parameters. Additionally, there are six keys which are used to enter data into the system. Both the liquid crystal display and the keycaps are rear-illuminated. The illumination level is automatically reduced whenever vehicle headlights are turned on.

The control module may be mounted in the car in one of several ways. Either 1) adhered directly to the dashboard or any flat surface with the double sided adhesive tape provided;

2) adhered to a mounting plate which has been secured to the mounting surface with either pop rivets or self tapping screws (this mounting plate has a concave back surface to accommodate curved mounting surfaces);

3) in the CB mic style case, on a dash mounted clip, in such a manner that the control module while still tethered to the dashboard (and power module) by means of its coil cord, may be removed from the mounting clip and hand held to facilitate pushing the keys or viewing the display; or 4) in the DIN configuration, the control module may be mounted directly in an extra DIN radio slot or mounted in a panel which may be trimmed to fit any available opening.

2) Power Module. Housed in an extruded aluminum heat sink/case, this unit is intended to be mounted inconspicuously under the dashboard, under a front seat, or in the trunk. The power module houses the bulk of the electronics for the device including the microprocessor, switching power supply used to control fan speed, the AC relay, manual bypass relay, heater valve drive circuitry, etc. A choke assembly to minimize EMI is included as a peripheral assembly. Wiring to the car and related components is accomplished using a plug in wire harness.

3) Aspirator Assembly. This assembly comprises a thermistor holder, fan assembly, and the cable and hoses connected to each. The purpose of the aspirator assembly is to measure the ambient temperature inside the vehicle passenger compartment. This is the only means by which the microprocessor can evaluate temperatures inside of the vehicle and respond appropriately. The actual temperature measurement is performed with a thermistor which has been scaled for most linear operation in the desired range. The thermistor is housed in a molded plastic holder which is mounted in the vehicle dashboard through a drilled hole, so situated that it approximates the ambient conditions to which the vehicle occupants are exposed.

The fan assembly comprises a small muffin fan mounted in a molded housing (fan shroud). The housing is so designed that the fan draws air through the hose connection nipple at its top and expels it through the open space created by the extended mounting legs at the bottom. The purpose of the fan assembly is to draw air through the thermistor holder. This serves several purposes including: 1) drawing air from inside the passenger compartment into the thermistor holder to obtain an "averaged" rather than a highly localized temperature reading;

2) dramatically reducing the thermal time constant of the thermistor (the time required to adjust to a change in temperature) as thermistors are slow to respond in still air; and 3) minimizing any micro-climate effect caused by self-heating of the thermistor as a result of power being dissipated through it, or thermal retention of the housing itself.

4) Heater Valve. A solenoid actuated normally open heater valve is supplied to regulate the flow of coolant into the vehicle's heater core, thereby providing a means of controlling heat in the passenger compartment. The valve is installed in the supply line to the heater core in series with the OEM valve if one exists. A separate valve was specified rather than attempting to control the OEM valve because there are numerous different systems of OEM valve control (mechanical, electrical, vacuum, multiple vacuum) and many vehicles are not equipped with valves but use air blending flaps instead to regulate heat.

The use of this solenoid valve is an important contribution to the universality of the climate control system. A normally open valve makes this part of the system failsafe (in that the operator may return to manual operation of the system with no loss of heater function) in the event of microprocessor, valve solenoid, or related drive circuitry failure. The valve is supplied in a number of different bib sizes to accommodate all popular heater hose ID's.

While the valve may only be either fully open or fully closed, a proportioning effect is simulated by varying the duty cycle (percentage of open time). Because of the relatively long thermal time constant of the heater core, a fairly constant and predictably variable temperature can be maintained in the heater core.

Integral to the valve assembly is a coolant threshold temperature thermostat (which is an electrical device which is an open circuit below a specified temperature, and which closes at and remains closed above the specified threshold temperature). The purpose of this thermostat is to monitor coolant temperature and notify the microprocessor when it has become sufficiently elevated that heat will be available if required. Until this thermostat closes, the fan speed is inhibited (only in automatic fan mode) to prevent blowing cold air on the vehicle occupants.

5) External Temperature Sensor. This device is mounted under the front bumper of the vehicle and incorporates a temperature sensing integrated circuit to read outside air temperature. The sensing device is thermally coupled (using a special potting compound) to the molded plastic housing inside of which it is sealed.

Theory of Operation

The operator selects the temperature which is desired inside of the vehicle using the up and down keys on the control module to change the temperature displayed digitally on the liquid crystal display. The microprocessor compares the desired temperature to the ambient temperature inside of the car as read through the aspirator assembly. The comparison of these two temperatures will indicate that the car is either cooler, warmer, or the same as the desired (preset) temperature. The control algorithm resident in the microprocessor takes appropriate actions to bring the interior temperature to equilibrium at the specified preset temperature. This is accomplished by either turning on the heat or the air conditioner and varying the fan speed.

There are five basic modes of fully automatic operation, each defined by the direction and magnitude of the difference between the car interior temperature and the preset temperature (delta T). In full heat mode, the fan is at full speed and the heater valve is fully open. This obviously provides the greatest possible heat to warm the car as quickly as possible. In delta heat, once delta T is 9 degrees F or less, fan speed and heater valve duty cycle are gradually decreased as cabin temperature approaches the desired temperature. The closed loop control algorithm constantly monitors and modifies the parameters to accommodate the many possible environmental variables (including but not limited to outside temperature, amount of sunlight, number of passengers, heat loss or gain through glass and other surfaces, etc.).

In the steady state mode, when the measured cabin temperature and the desired set point temperature are equal, the heater valve is closed and the air conditioner is off. Fan speed is gradually decreased until minimum speed is reached or the measured cabin temperature changes.

In full cool mode, AC is on and fan speed is full. In delta cool, AC is on and fan speed is varied against a fixed baseline control formula to accommodate conditions. In order to minimize passenger discomfort, a two measurement period (ten second) delay has been built into the control algorithm restricting the introduction of heat into the cabin should the ambient temperature overshoot the setpoint (from the delta cool zone) and enter the delta heat zone.

This closed loop control algorithm, like the universal heater valve, makes the climate control system truly universal in that it tailors itself not only to the varying requirements of the weather and environment, but to the dramatically different environments of widely divergent vehicles as well.

In addition to the self correcting features of the algorithm, several shorting pins have been provided inside the power module in order that the manufacturer or installer may further customize the device to the application. Variable parameters include minimum fan speed in heat and cool modes, temperature update rates, centigrade/fahrenheit selection, English language/universal symbols, etc.

DETAILED DESCRIPTION OF THE INVENTION

The Installer is to be an after-market item, universally installable with most world-wide manufactured cars.

Figure 1:
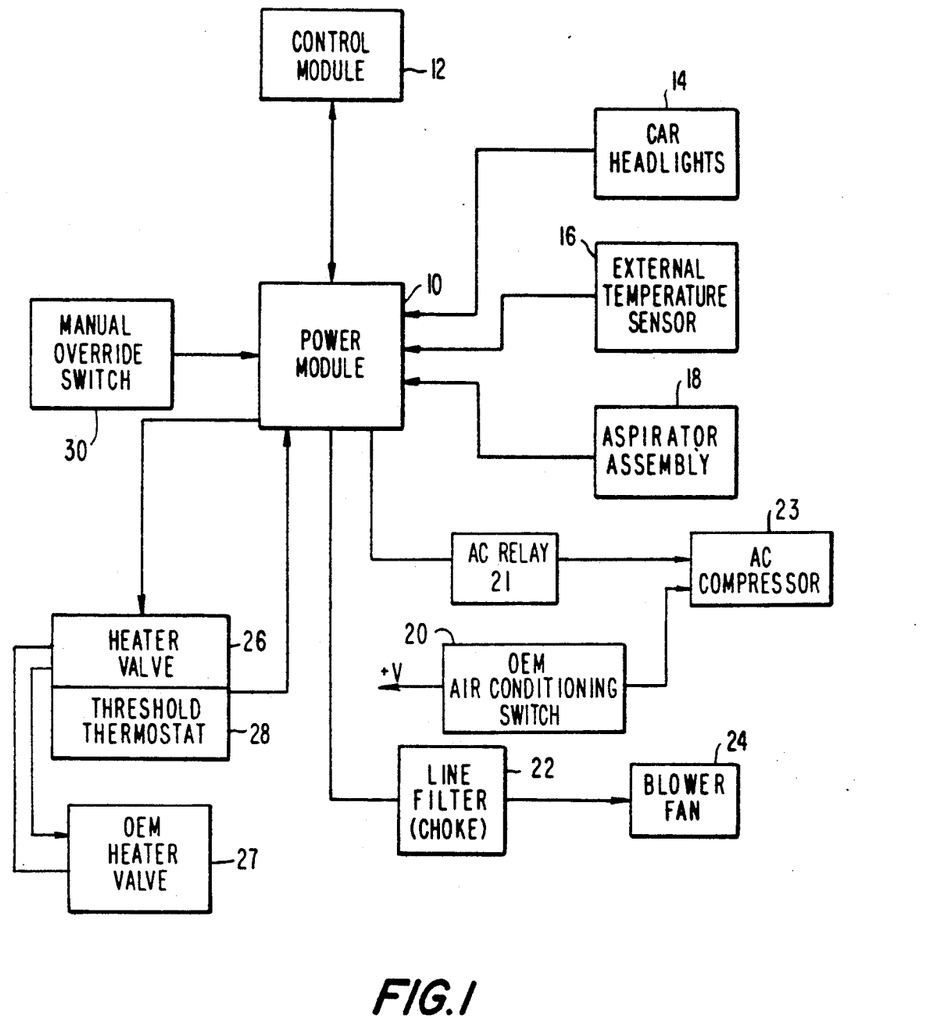
FIG. 1 is a block diagram of the CLIMATE CONTROL INSTALLER unit of this invention.

FIG. 1 is a block diagram of the system. It includes a Power Module 10, which is essentially the brain or control center of the entire system. Everything either feeds into the Power Module or is controlled by the Power Module. The Power Module contains the microprocessor, in which is resident the control algorithm which dictates the control function for each of the devices in the system. The Power Module also contains the switching power supply which controls the fan speed of the car's blower fan. It also includes various relays which are used to turn on and off the air conditioning, which are used to turn the system completely on or off with the system being switchable between Automatic, Off and Manual and it is the point from which all of the wiring which connects to the car and to the ancillary devices emanates from the Power Module.

The Control Module 12 is a unit which is connected to the Power Module. The Control Module contains a display which gives a visual indication of the status of the system, including the preset temperature. This preset or set point temperature is the temperature that the user sets to be maintained inside the car. The display also indicates the status or functional parameters of the fan and the air conditioning. It also shows, in momentary mode, the external temperature when that mode is selected. It will indicate system overall status when Manual or Off modes have been selected.

The display is a backlit negative transmissive mode display, such that the entire display is black, except for the characters which are the symbols and alphanumerics indicating the functions described. The level of backlight illumination is controllable at two levels, which is determined automatically when the car's headlights are turned on or off. When the car's headlights are on the backlight illumination level is dropped to low.

The Control Module contains six keys or push buttons that are used to configure the system. There are two buttons dedicated to the preset temperature: there is an up arrow key and a down arrow key which are used to move the preset temperature level up or down. The air conditioning key selects one of three air conditioning modes of operation. One of those modes is automatic, where the air conditioner is turned on and off as required by the microcontroller. If cooling is required when the set point temperature is lower than the ambient temperature, the air conditioner is turned on; if heating is required, the air conditioner is turned off. The second mode of operation of air conditioning is Off, which means that the air conditioner will remain off regardless of the temperature conditions.

The third mode of operation is On, in which the air conditioner will remain on regardless of temperature. (Operation of the air conditioner is interlocked to that of the fan; the air conditioner will not run when the fan is off.) Even in the event that heating is required, the air conditioner will stay on but, in the automatic mode, the system will still attempt to maintain the temperature inside of the car by turning on the heat. One advantage to having this On function is that heated air can be dehumidified, which is useful for clearing a fogged windshield, for example, on a humid day.

The fan button scrolls through four different states of operation for the fan. One is Fan-Auto, where the fan is varied in sixteen discrete steps as required automatically by the microprocessor as a function of temperature and the control algorithm. Another state is Off where the fan is completely off. Another is Fan-Low, where the fan speed is maintained at a constant low speed regardless of conditions and the last is Fan-High, where the fan speed is maintained at a constant high speed regardless of conditions. There are two more buttons, one of which is External which provides an approximate five second momentary display of external temperature in place of the preset temperature display on the Control Module. The other is a "System" button, which allows the user to select one of three basic modes of operation for the entire system: Climate Control, Manual and Off.

The three modes of operation are Climate Control, where the system is controlling the heat, air conditioning and fan speed, to maintain the temperature. The second mode of operation is Manual Mode, where the control of heat, air conditioning and fan speed revert back to the car's OEM controls. The car's original fan speed selector switch is used to control the fan speed, and the car's heat and air conditioning controls are used to control heat and air conditioning respectively. The third mode of operation is Off. When this mode is selected all the basic components of the system are off. This includes closing the heater valve so that no hot water will flow into the heater core. The fan and the air conditioning are both off.

Car headlights 14 is an input to the Power Module 10. There is a current sensing wire which is spliced into any wire which is energized when the car's headlights are energized. The Power Module detects that the car headlights have been turned on, in which case the backlight illumination level to the Control Module display is lowered.

External temperature sensor 16 is a device which also feeds data into the Power Module 10. It is located remotely under the front bumper of the car, and it contains a temperature sensing IC, which provides a fairly linear temperature response from about 20 degrees Fahrenheit below 0, to about 120 degrees above 0. Sensor 16 is contained in the housing which is designed to be pop riveted or may use self-tapping screws to attach to the skin of the car bumper. The housing also has an air dam feature which is intended to prevent evaporative cooling from skewing or distorting the actual temperature of the case and consequently the sensor.

Aspirator Assembly 18 is an assembly which is located in the passenger compartment of the car, and which is connected to the Power Module and indicates what the temperature is in the passenger compartment. That information is used to make a determination as to what actions are appropriate to be taken in order to reach and then maintain the desired set point temperature.

The Aspirator Assembly comprises two parts. One is a thermistor holder, which is a small multi-part plastic housing which is mounted in the dashboard of the car. It contains a tube with a small open grill at one end, which is open to the environment of the passenger compartment. Inside of the tube is a thermistor which is connected in series with a circuit in the Power Module 10 to enable the Power Module to read electrically the temperature inside the car. The tube in which the thermistor is resident is connected by means of a small hose to the other component of the aspirator assembly, which is the aspirator fan. That comprises a fan shroud and a small muffin fan which draws air through the tube and consequently through the thermistor assembly or thermistor holder. This activity is to avoid the stagnation of air inside of the thermistor holder which would give a highly localized and perhaps inaccurate reading of the temperature inside of the car. It draws air in from a much broader area of the passenger compartment and gives a more realistic somewhat averaged reading of what the temperature inside the car is. There are several other micro-climate issues which are obviated by this aspirator assembly, one of which is self-heating of the thermistor as a result of the small amount of power which is being dissipated through it in order to read its resistance, and another is heating of the air in the immediate vicinity of the thermistor as a result of heating of the black plastic thermistor housing or direct heating by the sun.

Air conditioning switch 20 simply references the car's OEM air conditioning switch assembly. Relay 21 could be described as an air conditioner switch because the Power Module 10 is connected in parallel with the wiring at the OEM air conditioner switch, and that is how the system turns on and off the air conditioner compressor 23. The reason for such an arrangement as opposed to going directly to the compressor or some more fundamental aspect of the air conditioning system is that there are numerous safety systems and devices built in which prevent running the system if there is no freon or cooling gas in the system, or if there is an overheat or an under-temperature condition. To avoid bypassing those safeties the air conditioner is turned on and off at the air conditioner switch.

Line filter 22 is a device which is in line with the wires emanating from the Power Module 10 which are connected to the car's blower fan 24. The line filter 22 is a toroidal choke assembly which is potted to eliminate objectionable noise which is created as a result of the microphonics of the toroidal windings. The line filter minimizes the EMI or radio frequency interference, which can be picked up over the car's AM radio.

The car's OEM blower fan 24 is used to circulate hot or cold air in the passenger compartment. Again, the speed of that fan is preferably controlled in 16 discrete steps.

Heater valve 26 is a solenoid energized heater valve which is placed in series with the car'OEM 27 if one exists. The heater valve 26 is a normally open device, which enables the system of this invention to be more fail/safe than would be the case where a normally closed device is used. In the absence of the hardware or means of energizing the valve, there is still full control of the heat through the car's OEM valve, if one exists.

Coolant threshold thermostat 28 is located inside of the body of the heater valve. This is a go/no go device which is a bimetallic strip type of thermostat used to identify for the Power Module when the coolant has reached or exceeded a certain threshold temperature above which it is considered that heat is available should heat be required. The purpose of providing the Power Module this information, and more specifically giving the microprocessor this information is that in the event heating is required when the fan is set to the automatic mode, the fan cannot be turned on until heat is available, at which time warm air would then be blown into the passenger cabin.

The heater valve 26, like the thermostat is a go/no go device. In other words, it can only be all the way open or all the way closed. There is a control algorithm which simulates a proportioning valve effect which is accomplished by controlling the open and closed time ratio of the heater valve (duty cycle) over a fixed 20 second cycle. This can be varied in 1¼ second increments by varying the open/closed ratio so that a fairly constant and predictable level of heat will be available at the heater core. A relatively high fan speed is maintained to obtain good air circulation without overheating the interior of the car and overshooting the set point without having to drop the fan speed dramatically.

Manual Override switch 30 is a switch which is incorporated in the system in the event there is a catastrophic failure of the microprocessor or related circuitry. Switch 30 will enable the operator to essentially return the system to Manual Mode without having to go through the microprocessor as one does if Manual Mode is selected using the system button on the Control Module.

The following is a recapitulation of the above and a brief description of the installer climate control.

The Installer Climate Control Power Module 10 accepts keyboard entry related to the operating mode selected and the desired temperature of the car's cabin. It compares this information to the actual temperature of the cabin and by controlling both the air conditioning and heating controls of the automobile as well as the speed of the fan, it causes the cabin temperature to be maintained as near as possible to the desired temperature setting. The Climate Control also utilizes redundant circuits to disconnect major parts of its circuitry when in a Mode.

The Installer Power Unit consists of a microcomputer that processes all data and determines the current settings for the fan, air conditioning relay and heater valve 26. It also services the keyboard located in the Control Module 12 and provides inputs to the display located within the Control Module. Virtually all inputs and outputs to and from the microcomputer are serially shifted data bits to accommodate the large number of bits required. The micro computer outputs the desired fan speed on four serially shifted bits to a D/A Converter. The D/A Converter provides an analog stimulus to the fan drive circuit.

The Fan Drive Circuit consists of a PWM Comparator that produces a varying duty cycle constant frequency square wave whose average value represents the desired fan speed. The PWM Comparator drives a FET Driver which utilizes a bias of approximately 26 VDC derived from the bias oscillator and tripler circuits to drive the output FET stage. The FET Stage output is a high power square wave that is then filtered and output to the Fan Motor. The Bias Oscillator also provides the ramp necessary for the PWM Comparator.

The FET Output Stage derives its power from the car battery after it is suitably surge suppressed and filtered.

The Manual Override Mode causes the Climate Control to become transparent to the automobile's controls. In the Manual Mode, the Fan output duty cycle is set to constant ON and both the Air Conditioning and Heater Solenoid controls are disabled. The air Conditioning Control utilizes two relay contactors wired in series featuring one relay normally operating while the manual override relay operates only when in Manual Override Mode. This feature makes it possible to manually control the air conditioner even if a relay fails. Likewise, two FETs connected in series are utilized to drive the Heater Valve. One FET is normally operating while the other FET is operated only by the Manual Override Mode. This feature makes it possible to operate the heater manually even if an FET fails.

Power for all of the control circuits is derived from the keyed output of the automobile's ignition switch. Control power is 8 Volts as determined by a fixed regulator. Logic power is provided by a 5 Volt Regulator. The microprocessor utilizes a low power consumption regulator connected to the automobile's battery to assure that even when the ignition switch is turned off, the microprocessor will continue to store all programmed information. When the ignition switch is turned off and also during a low voltage surge such as when the automobile is being started, the Voltage Sensor determines that input power is about to disappear and provides an interrupt to the microprocessor forcing the microprocessor to enter the keep alive state. After sufficient time to enter the keep alive state is past, the microprocessor is held in the Reset state until power returns. The clock for the microprocessor is also held off during the Reset state. In the Reset state, the microprocessor is disabled and draws only a few microamperes causing negligible drain on the automobile's battery.

With reference to the novelty of the present invention, two important points relating to FIG. 1 are identified. The heater valve 26 is connected in series with the automobile's originally installed or OEM heater valve if there is one in order to universalize the Add on Climate Control System of the present invention. Additionally, and as described in a prior patent application to Hans Weigert, Ser. No. 07/756,034, assigned to the same assignee as is the present application, the system is connected to the positive side of the blower fan in order to be able to neutralize any individual blower fan peculiarities and to universalize and assist in the ability to install the climate control system of the present invention in almost any preexisting automobile which is equipped with an air conditioner and heater.

The operation of the Installer Climate Control System in the automatic fan and automatic A modes of the present invention is as follows:

The user would enter using the keys on the control module 12 the temperature which is desired to be maintained inside of the cabin. That information is relayed to the microprocessor in the power module 10. It will read in the cabin temperature through the aspirator assembly 18, and it will read in whether or not the coolant temperature is above the threshold temperature which is deemed sufficient to provide heat to the cabin. Based on these inputs, the power module 10 will now issue commands to the various ancillary devices involved in the system in order to attain and then maintain the desired set point temperature as entered by the user. Once the cabin temperature has been determined, it will be compared to the preset temperature level as entered through the control module 12, and the determination will be made as to both the direction and magnitude of the difference. It will be determined whether heating or cooling is required and specifically how many degrees difference exist based on the need for heating or cooling and the number of delta degrees or delta T from set point.

The control algorithm is selected which is appropriate for one of five basic states of control. The five basic states of control are (1) equilibrium or set point which indicates that the temperature in the cabin is the same as the temperature which has been selected as set point. (2) delta cool condition which indicates that the temperature in the cabin is at a fixed number of degrees or less above the set point temperature; (3) full cool state which indicates that the temperature is a fixed degree or more above the desired set point temperature; 4) a delta heat state which indicates that the ambient temperature or cabin temperature is 1 to 9 degrees cooler than the set point temperature; and (5) is full heat which indicates that the cabin temperature is 10 degrees or more cooler than the set point temperature. Depending on the range of the control algorithm the power module will dictate that certain steps be taken. In the delta cool mode, the air conditioner is switched on, the fan speed is then selected as a function of delta T and this is regulated by the control algorithm. A certain default setting is used to initialize the system, and this default setting for fan speed may be altered based on conditions. The microprocessor is updated as to the cabin temperature every five seconds through the aspirator assembly 18 and based on what happens during each successive five second period, the control algorithm is modified.

This is an example of a closed loop control in the control algorithm. In the heat mode, delta heat mode, the fan speed is selected and controlled in the same way, and the heat in the heater core is regulated through the heater valve. The heater valve is, a go, no-go or an open or closed only device, but it is made effectively a proportioning valve by varying the duty cycle of its open and close time.

There are certain smoothing functions that have been built into the control algorithm which are intended to make the function of the device more aesthetically pleasing in that it does not appear to the vehicle occupants to have abrupt changes in heating or cooling nor abrupt changes in fan speed or abrupt shifts from heating mode to cooling mode. One of these smoothing devices is a ten second or two time period delay during which the heating mode can not be entered if the system was previously in a cooling mode. This is set because if the set point is overshot from cooling mode, it is undesirable to introduce heat into the cabin to get back to the set point because this is perceived as an uncomfortable state of affairs for the car occupants. Instead, the system waits a certain number of seconds, while the temperature rises of its own accord slide back to the set point or perhaps even into the delta cool zone.

Figure 2:
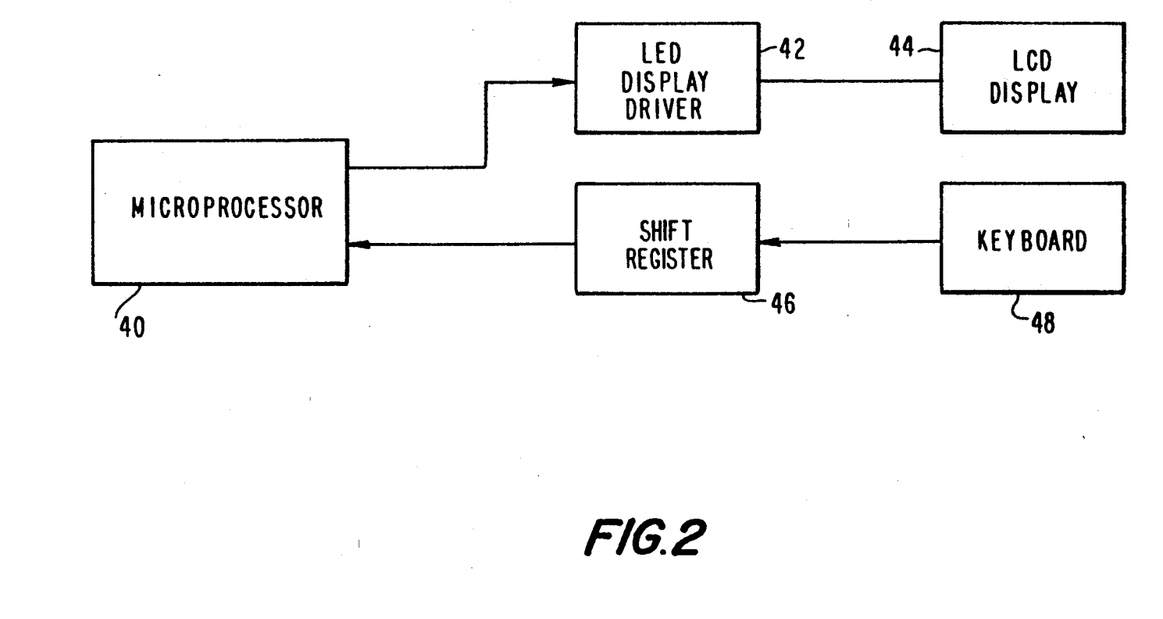
FIG. 2 is a block diagram of the Power Module/Control Head Interface of this invention.
Figure 3:
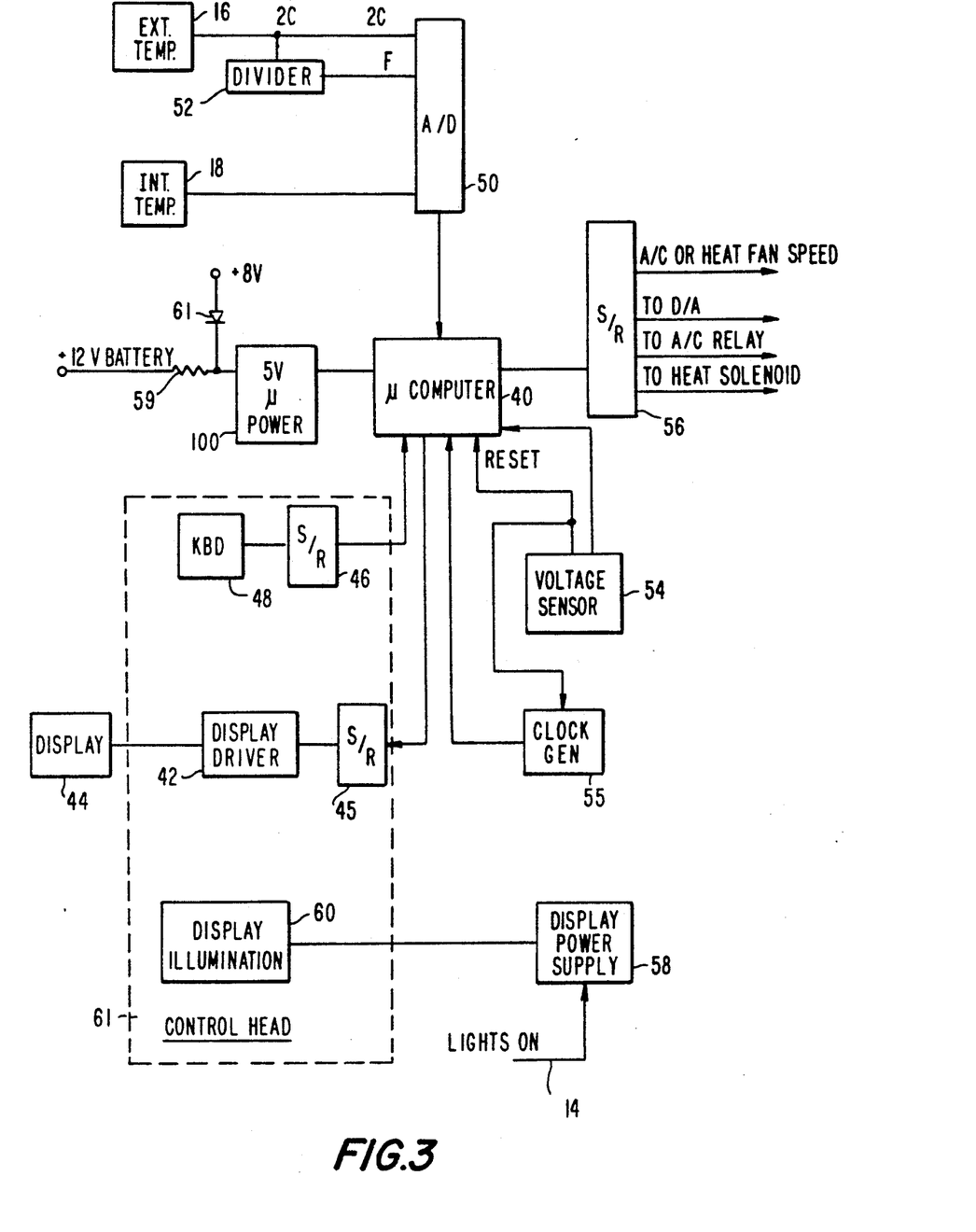
FIGS. 3 and 4 are block diagrams of the Power Module and the Control Head as related elements of this invention.

FIG. 2 illustrates the basic block diagram of the control head which is part of the control module 12 including inputs from the microprocessor 40 which is in the power module 10. LCD display driver 42 receives inputs from the microprocessor 40. Referring to FIG. 3, there is an internal shift register 45 which receives data from the microprocessor 40 which is used to drive the LCD display 44. Keyboard 48 is connected to and drives a shift register 46 which is then inputted to the microprocessor 40. Microprocessor 40 is a National Semiconductor COP 344C device which may be programmed in a conventional manner to perform the functions described for the system of this invention. Such algorithm is described in detail below.

Microprocessor 40 receives inputs from an A to D converter 50 which converts the analog output of the external temperature sensor 16 in either centigrade or through divider 52 to Fahrenheit and the analog output of internal or cabin temperature sensor 18. Such sensors 16 and 18 are connected as inputs to A/D convertor 50. Shift register 56 shown in FIG. 4, is connected to an output line of the microprocessor 40 and that drives the AC or heat mode minimum fan speed selection, the D/A converter, the AC relay, the heater solenoid and the manual mode relay.

Figure 4:
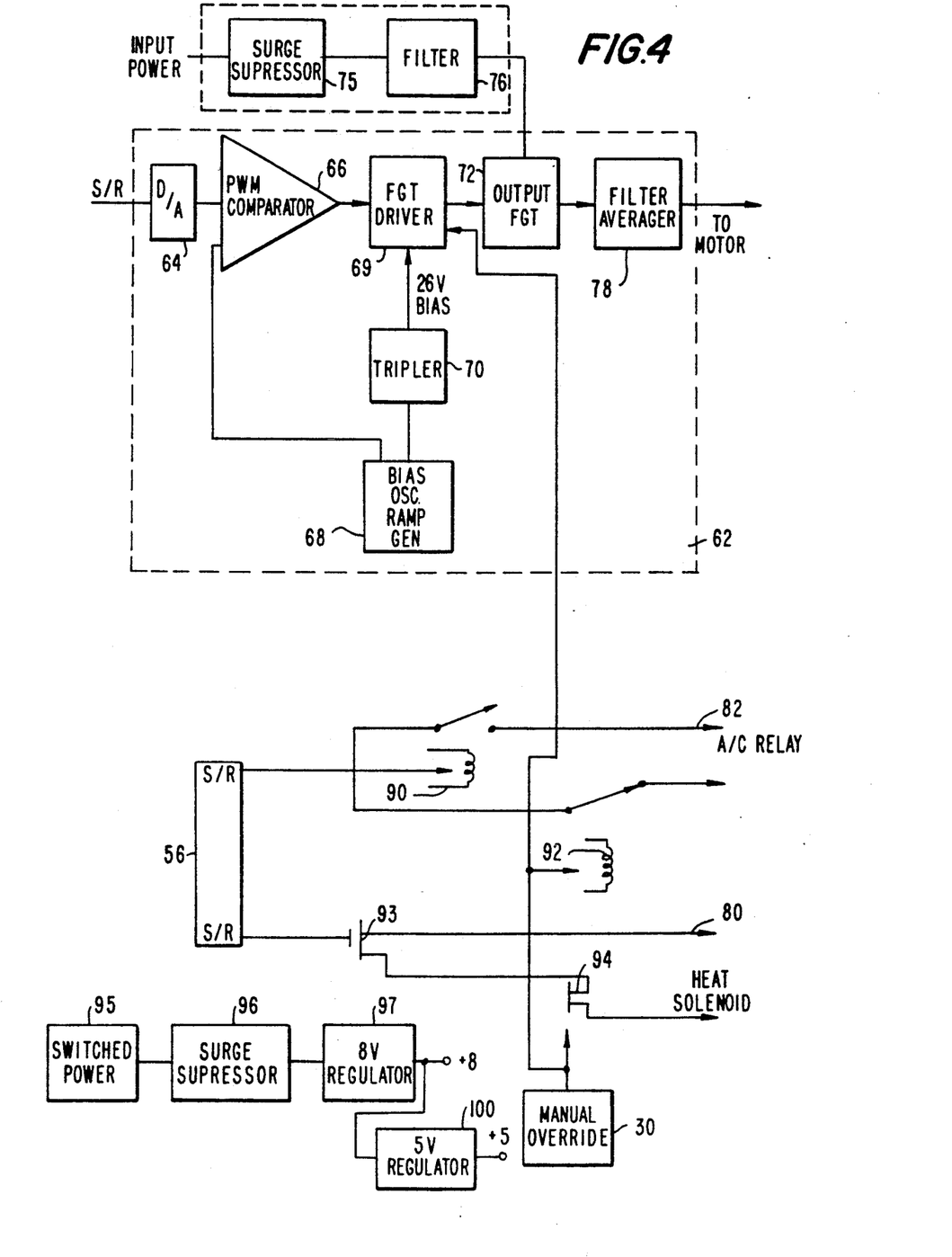

FIGS. 3 and 4 are block diagrams of separate portions of the power module. FIG. 3 also includes the block diagram on the Control Module. Voltage sensor 54 is part of the reset circuit, and this freezes the clock in the microprocessor when the ignition of the vehicle is shut off and restarted such that the data will not be lost and the microprocessor will come up in the same mode when the car is restarted. The voltage sensor 54 is connected to the microprocessor as seen in FIG. 3. Display illumination 60 is connected to and is driven by a display power supply 58 which receives an input from car headlights 14.

A clock generator 55 supplies clock signals to microprocessor 40 and is connected to the Reset line on voltage sensor 54.

The 12 volt automobile battery is connected through a resistor 59 to the cathode end of a diode 61 and is also connected as an input to 5 volt power sensor 100, which, itself, is connected to microprocessor 40.

As shown in FIG. 3 keyboard 48, shift register 46, display 44, LCD display drive 42 with its internal shift register 45, and display illumination 60 form the control module 61 which is accessible to the driver during normal driving conditions.

Referring to FIG. 4, fan drive circuit 62 comprising a number of different components is shown.

Fan drive circuit 62 receives its input from the shift register 56, which is converted in a D to A converter 64. The output of D to A converter is connected as one input to a two-input pulse width modulated (PWM) comparator 66, the other output of which is supplied by a bias oscillator ramp generator 68. The output of PWM comparator 66 is supplied as an input to FET driver 69, and a second input of which is supplied by a tripler 70. Tripler 70 receives its input from bias oscillator ramp generator 68, and a 26 volt bias is established on FET driver 69. The output of FET driver 69 is supplied as one input to two-input output FET 72, the other input of which is supplied as a power input through input power circuit 74. Input power circuit 74 receives its input power from the automobile's power which is supplied through a surge suppressor 75 and filter 76 to the power input for output FET 72. The output FET 72 is supplied through a filter averager 78 to control the motor.

Manual override switch 30 is shown connected to heater solenoid drive 80 as well as the AC relay 82, both of which also receive inputs from the shift register 56 which is controlled by the microprocessor 40.

The Manual Override Mode causes the Climate Control to become transparent to the automobile's controls. In the Manual Mode, the Fan output duty cycle is set to constant ON and both the Air Conditioning and Heater Solenoid controls are disabled. The Air Conditioning Control utilizes two relay contactors 90 and 92 wired in series featuring one relay 90 normally operating while the manual override relay 92 operates only when in Manual Override Mode. This feature makes it possible to manually control the air conditioner even if a relay fails. Likewise, two FETs 93 and 94 are connected in series and are utilized to drive the Heater Valve. One FET is normally operating, while the other FET is operated only by the Manual Override Mode. This feature makes it possible to operate the heater manually even if an FET fails.

Power for all of the control circuits is derived from the keyed output of the automobile's ignition switch 95 which is connected through a surge suppressor 96 to a fixed regulator 98. Regulator 98 provides eight volt control power for the system. Logic power is provided by a 5 Volt Regulator 100 connected to the output of the eight volt regulator 98. The microprocessor utilizes a low power consumption regulator connected to the automobile's battery to assure that even when the ignition switch is turned off, the microprocessor will continue to store all programmed information.

The following is a description of Set Point Slewing.

Moving the Set Point a number of degrees generally requires the depressing of the appropriate Set Point key that same number of times. Slewing only requires that the appropriate Set Point key be held down until the display indicates the desired Set Point temperature.

Depressing the Set Point Up or Set Point Down key will cause an immediate change of one degree in the Set Point temperature. After a delay of approximately one second, the display will slew in the selected direction at an approximate ½ second rate.

Slewing will stop when the Set Point key is released. Slewing will also stop once the upper or lower Set Point temperature limit is reached. The delay and slewing rate times can be adjusted if necessary under control of the microprocessor 40.

DESCRIPTION OF THE TEMPERATURE CONTROL ALGORITHM

This may repeat some prior information, but such information is prescribed for a comprehensive identification of the temperature control algorithm.

Temperature in the vehicle's passenger compartment is regulated by controlling fan speed, by turning the air conditioner on and off, and by means of a normally open hot water control valve which regulates the amount of hot water flowing through the vehicle's heater core. A temperature sensitive device is used to measure the Ambient Temperature in the passenger compartment. Ambient Temperature in the passenger compartment is measured every five (5) seconds.

Fan Speed Control

Two minimum fan speeds are incorporated into the system. The minimum fan speed when air conditioning is not required is set to approximately 25% of full fan speed. The minimum fan speed when air conditioning is required is set somewhat higher at approximately 33% of full fan speed. Provision has been made for individual selection of higher minimum fan speeds for both conditions.

Fan speed can be set to any one of sixteen (16) different speeds. Minimum fan speed is fan speed "0" while maximum fan speed is fan speed "15". Fan speeds "1" to "14" are set equi-spaced between the minimum and maximum fan speeds. Since the air conditioning minimum fan speed is higher than the heating minimum fan speed, each air conditioning fan speed increments is somewhat smaller.

The fan can be placed into one of four (4) operating conditions: OFF, LOW, HIGH and AUTOMATIC. The first three operating conditions either turn the fan off or set it to run at a fixed pre-determined speed. The AUTOMATIC operating condition allows the microprocessor to determine fan speed based on heating or cooling requirements.

Hot Water Flow Control

Hot water flow through the heater core is controlled over a twenty (20) second cycle. This twenty second cycle is divided into increments of 1.25 seconds each. The Hot Water Valve can be opened for the entire 20 seconds, closed for the entire 20 seconds, or open from 1.25 seconds to 18.75 seconds in 1.25 second increments.

Selection of the amount of time that the Hot Water Valve is open during the twenty second cycle is determined by the fan speed and heating requirements. The microprocessor determines the Hot Water Valve open time when heat is demanded. The Hot Water Valve is closed when no heat or air conditioning is required, or when heat is required and the fan is OFF. For the first two conditions, the air conditioner is either always OFF or always ON. The AUTOMATIC operating condition allows the microprocessor to determine air conditioning requirements based on cooling requirements.

Heat Delay

Heating or cooling the passenger compartment is determined by measuring the Ambient Temperature in the vehicle's passenger compartment and comparing this temperature to the desired or "Set Point" Temperature. If the Set Point temperature is lower than the measured passenger compartment Ambient Temperature, air conditioning is required. If the Set Point temperature is higher than the measured passenger compartment Ambient Temperature, heating is required.

The difference between the Set Point Temperature and the measured passenger compartment Ambient Temperature is referred to as "Delta-Temp".

When cooling is required and the air conditioning system is operating in the AUTOMATIC mode, the microprocessor will run the air conditioner continuously until Delta-Temp is zero. The air conditioner is then turned off. However, it is possible that an "overshoot" condition could occur in which the measured Ambient Temperature in the passenger compartment becomes slightly cooler than the Set Point Temperature.

While this circumstance would normally demand heat, the passenger compartment could warm somewhat of its own accord in several seconds due to warmer outside air temperatures. Therefore, in order to prevent the unnecessary use of heat, when the Climate Control System has been previously operating in a cooling made, the Hot Water Valve is not opened until a pre-determined time delay has elapsed. This time delay is presently set to ten (10) seconds.

Temperature Control States

Temperature control is divided into five specific regions or "states" based on the difference between the measured Ambient Temperature in the passenger compartment and the Set Point Temperature. A brief overview of each of these five (5) states is given below. These states are:

| State | Description |
|---|---|
| 0 | Full Cool |
| 1 | Delta Cool |
| 2 | Steady State |
| 3 | Delta Heat |
| 4 | Full Heat |

State 0 (Full Cool)

Temperature control is in State 0 when the measured Ambient Temperature in the passenger compartment is five (5) or more degrees higher than the Set Point Temperature. In the Automatic Fan Mode, fan speed is set to maximum. In the Automatic Air Conditioning Mode, Air Conditioning is on continuously. The Hot Water Valve is energized cutting off all hot water flow.

State 1 (Delta Cool)

Temperature control is in State 1 when the measured Ambient Temperature in the passenger compartment is one (1) to four (4) degrees higher than the Set Point Temperature. In the Automatic Fan Mode, fan speed is related to the difference between the measured Ambient passenger compartment temperature and the Set Point temperature—essentially the smaller the temperature difference, the lower the fan speed. In the Automatic Air Conditioning Mode, Air Conditioning is always on. The Hot Water Valve is energized cutting off all hot water flow.

State 2 (Steady State)

Temperature control is in State 2 when the measured Ambient Temperature in the passenger compartment is equal to the Set Point Temperature. In the Automatic Fan Mode, the fan speed is gradually decreased until either minimum fan speed is reached or the measured Ambient Temperature in the passenger compartment is no longer equal to the Set Point Temperature. In the Automatic Air Conditioning Mode, the air conditioner is off. The Hot Water Valve is energized cutting off all hot water flow.

State 3 (Delta Heat)

Temperature control is in State 3 when the measured Ambient Temperature in the passenger compartment is one (1 to nine (9) degrees lower than the Set Point Temperature. In the Automatic Fan Mode, fan speed is related to the difference between the measured Ambient passenger compartment temperature and the Set Point temperature—essentially the smaller the temperature difference, the lower the fan speed.

In conjunction with fan speed control, the Hot Water Valve is opened for specific amounts of time to control the amount of water flowing through the heater core, and hence assist in controlling the Ambient temperature in the passenger compartment. However, when the fan is off, the Hot Water Valve is closed. In the automatic Air Conditioning Mode, Air Conditioning is off.

State 4 (Full Heat)

Temperature control is in State 4 when the measured Ambient Temperature in the passenger compartment is ten (10) or more degrees lower than the Set Point Temperature. In the Automatic Fan Mode, fan speed is set to maximum. In the Automatic Air Conditioning Mode, Air Conditioning is off. The Hot Water Valve is de-energized allowing full hot water flow through the heater core.

State Table Entries:

As previously indicated, the air conditioner has three (3) modes of operation:
OFF,
ON, and
AUTOMATIC,
whereas the fan has four (4) modes of operation:
OFF,
ON,
LOW, and
AUTOMATIC.

Combining all possible fan and air conditioner modes of operation results in twelve (12) possible sets of fan and air conditioning controls in each operational state. Five "State Tables" have been prepared which fully define the operation of the air conditioner, the fan and the hot water valve in each state.

Table entry symbols are listed below. Note that hot water flows when the Hot Water Valve is OFF (no power applied), and does not flow when the Hot Water Valve is ON (power applied).

| SYMBOL | DESCRIPTION |
|---|---|
| AC | Air conditioner |
| ACMIN | Minimum fan speed for air conditioning |
| CNTL | Operation under computer control |
| Delta-Temp | Difference between measured passenger compartment and Set Point temperatures |
| FAN | Blower/Fan |
| FAN + 2 | Increment fan speed two steps |

-continued

| SYMBOL | DESCRIPTION |
|---|---|
| FAN − 3 | Decrement fan speed three steps |
| HTMIN | Minimum fan speed for heating or no air conditioning |
| MAX | Maximum fan speed |
| OFF | Fan, air conditioner or hot water valve off |
| ON | Fan, air conditioner or hot water valve on |
| VLV | Hot Water Valve |

FULL COOL - STATE 0

| FAN | AC OFF | AC ON | AC AUTO |
|---|---|---|---|
| AUTO | FAN = MAX<br>AC = OFF<br>VLV = ON | FAN = MAX<br>AC = ON<br>VLV = ON | FAN = MAX<br>AC = ON<br>VLV = ON |
| HI | FAN = MAX<br>AC = OFF<br>VLV = ON | FAN = MAX<br>AC = ON<br>VLV = ON | FAN = MAX<br>AC = ON<br>VLV = ON |
| LOW | FAN = HTMIN<br>AC = OFF<br>VLV = ON | FAN = ACMIN<br>AC = ON<br>VLV = ON | FAN = ACMIN<br>AC = ON<br>VLV = ON |
| OFF | FAN = OFF<br>AC = OFF<br>VLV = ON | FAN = OFF<br>AC = OFF<br>VLV = ON | FAN = OFF<br>AC = OFF<br>VLV = ON |

NOTES:
1. Ambient Temperature five (5) or more degrees F. above Set Point.
2. Hot Water Solenoid Valve Closed (energized): VLV = ON.
3. Temperature Measurement Rate = 5 Sec.
4. Minimum Air Conditioning on Fan Speed: FAN = ACMIN
5. Minimum Air Conditioning Off Fan Speed: FAN = HTMIN

DELTA COOL - STATE 1

| FAN | AC OFF | AC ON | AC AUTO |
|---|---|---|---|
| AUTO | FAN = CNTL<br>AC = OFF<br>VLV = ON | FAN = CNTL<br>AC = ON<br>VLV = ON | FAN = CNTL<br>AC = ON<br>VLV = ON |
| HI | FAN = MAX<br>AC = OFF<br>VLV = ON | FAN = MAX<br>AC = ON<br>VLV = ON | FAN = MAX<br>AC = ON<br>VLV = ON |
| LOW | FAN = HTMIN<br>AC = OFF<br>VLV = ON | FAN = ACMIN<br>AC = ON<br>VLV = ON | F.AN = ACMIN<br>AC = ON<br>VLV = ON |
| OFF | FAN = OFF<br>AC = OFF<br>VLV = ON | FAN = OFF<br>AC = OFF<br>VLV = ON | FAN = OFF<br>AC = OFF<br>VLV = ON |

NOTES:
1. Ambient Temperature 1–4 degrees F. above Set Point.
2. Hot Water Solenoid Valve Closed (energized): VLV = ON.
3. Temperature Measurement Rate −5 Sec.
4. Minimum Air Conditioning on Fan Speed: FAN = ACMIN.
5. Minimum Air Conditioning Off Fan Speed: FAN = HTMIN.
6. Auto Mode Fan Control (previously in State 1 or 2):
   a. If Delta-Temp (new) >= Delta-Temp (old):
      FAN = FAN + 2 up to FAN = MAX
   b. If Delta-Temp (new) < Delta-Temp (old):
      FAN = FAN − 3 down to FAN = ACMIN
7. Auto Mode Fan Control (previously in State 0, 3 or 4):
   FAN = 3 × Delta-Temp

STEADY STATE - STATE 2

| FAN | AC OFF | AC ON | AC AUTO |
|---|---|---|---|
| AUTO | FAN = FAN − 2<br>AC = OFF<br>VLV = ON | FAN = FAN − 2<br>AC = ON<br>VLV = ON | FAN = FAN − 2<br>AC = OFF<br>VLV = ON |
| HI | FAN = MAX<br>AC = OFF<br>VLV = ON | FAN = MAX<br>AC = ON<br>VLV = ON | FAN = MAX<br>AC = OFF<br>VLV = ON |
| LOW | FAN = HTMIN<br>AC = OFF<br>VLV = ON | FAN = ACMIN<br>AC = ON<br>VLV = ON | FAN = HTMIN<br>AC = OFF<br>VLV = ON |
| OFF | FAN = OFF<br>AC = OFF<br>VLV = ON | FAN = OFF<br>AC = OFF<br>VLV = ON | FAN = OFF<br>AC = OFF<br>VLV = ON |

NOTES:
1. Ambient Temperature = Set Point.

-continued

2. Hot Water Solenoid Valve Closed (energized): VLV = ON
3. Temperature Measurement Rate = 5 Sec.
4. Minimum Air Conditioning on Fan Speed: FAN = ACMIN.
5. Minimum Air Conditioning Off Fan Speed: FAN = HTMIN.
6. Auto Mode Fan Control:
   FAN = FAN − 2 down to FAN = ACMIN or HTMIN

DELTA HEAT - STATE 3

|  | AC | | |
|---|---|---|---|
| FAN | OFF | ON | AUTO |
| AUTO | FAN = CNTL<br>AC = OFF<br>VLV = CNTL | FAN = CNTL<br>AC = ON<br>VLV = CNTL | FAN = CNTL<br>AC = OFF<br>VLV = CNTL |
| HI | FAN = MAX<br>AC = OFF<br>VLV = CNTL | FAN = MAX<br>AC = ON<br>VLV = CNTL | FAN = MAX<br>AC = OFF<br>VLV = CNTL |
| LOW | FAN = HTMIN<br>AC = OFF<br>VLV = CNTL | FAN = ACMIN<br>AC = ON<br>VLV = CNTL | FAN = HTMIN<br>AC = OFF<br>VLV = CNTL |
| OFF | FAN = OFF<br>AC = OFF<br>VLV = ON | FAN = OFF<br>AC = OFF<br>VLV = ON | FAN = OFF<br>AC = OFF<br>VLV = ON |

NOTES:
1. Ambient Temperature 1-9 degrees F. below Set Point.
2. Fan Running: Hot Water Solenoid Valve Controlled:
   VLV = CNTL
3. Fan Off: Hot Water Solenoid Valve Closed (energized):
   VLV = ON
4. Control Rates:
   a. Temperature Measurement Rate = 5 Sec.
   b. Valve Control Cycle Rate = 20 Sec.
5. Minimum Air Conditioning on Fan Speed: FAN = ACMIN.
6. Minimum Air Conditioning Off Fan Speed: FAN = HTMIN.
7. Auto Mode Fan Control (previously in State 1 or 2):
   a. If Delta-Temp (new) >= Delta-Temp (old):
      FAN = FAN + 2 up to FAN = MAX
   b. If Delta-Temp (new) < Delta-Temp (old):
      FAN = FAN − 3 down to FAN = ACMIN
8. Auto Mode Fan Control (previously in State 0, 3 or 4):
   FAN = 3 × Delta-Temp
9. Valve Control (Fan Running):
   a. If FAN = MAX and Delta-Temp (new) >= Delta-Temp (old):
      Valve-Open (new) = Valve-OPEN (old) + 2.5 sec.
   b. If FAN = ACMIN or HTMIN
      and Delta-Temp (new) < Delta-Temp (old):
      Valve-Open (new) = Valve-OPEN (old) − 2.5 sec.
   c. Initial valve open time = 1.25 × Delta-Temp + 2.5 sec.
10. Heat Delay:
    Start of heating cycle delayed by 10 seconds if
    cooling was previously required.

FULL HEAT - STATE 4

|  | AC | | |
|---|---|---|---|
| FAN | OFF | ON | AUTO |
| AUTO | FAN = MAX<br>AC = OFF<br>VLV = OFF | FAN = MAX<br>AC = ON<br>VLV = OFF | FAN = MAX<br>AC = OFF<br>VLV = OFF |
| HI | FAN = MAX<br>AC = OFF<br>VLV = OFF | FAN = MAX<br>AC = ON<br>VLV = OFF | FAN = MAX<br>AC = OFF<br>VLV = OFF |
| LOW | FAN = HTMIN<br>AC = OFF<br>VLV = OFF | FAN = ACMIN<br>AC = ON<br>VLV = OFF | FAN = HTMIN<br>AC = OFF<br>VLV = OFF |
| OFF | FAN = OFF<br>AC = OFF<br>VLV = ON | FAN = OFF<br>AC = OFF<br>VLV = ON | FAN = OFF<br>AC = OFF<br>VLV = ON |

NOTES:
1. Ambient Temperature ten (10) or more degrees F. below Set Point.
2. Fan Running: Hot Water Solenoid Valve Open (de-energized):
   VLV = OFF
3. Fan Off: Hot Water Solenoid Valve Closed (energized):
   VLV = ON
4. Temperature Measurement Rate = 5 Sec.
5. Minimum Air Conditioning On Fan Speed: FAN = ACMIN.
6. Minimum Air Conditioning Off Fan Speed: FAN = HTMIN.

The Installer Climate Control System of this invention has been described above in some detail with regard to a preferred embodiment. Modifications of the system are well within the scale of those in the art, and such modifications are intended to come within the scope of protection of the invention as set forth in the appended claims.

We claim:

1. An aftermarket universal installer climate control system for installation in any of a variety of vehicles having air conditioning and heating systems and having a heater core into which coolant flows and a pre-existing control device to control heat in the passage compartment, said heater core being connected in a circulation path in which coolant flows thereto to control the temperature thereof, said climate control system comprising:

a control module adapted to be mounted in the passenger compartment to be accessible to a driver of the vehicle for easy operation,     an aspirator assembly located proximate to the passenger compartment to determine the temperature in the passenger compartment,     a power module electrically connected to the control module, said power module being connected to said aspirator assembly to receive electrical signals concerning the ambient temperature in the passenger compartments, said power module comprising a microprocessor to control the air conditioning and heating system to climate control the passenger compartment of the vehicle,     and at least one independent heater valve adapted to be connected in said recirculation path responsive to the microprocessor to regulate the flow of coolant to the heater core.

2. An installer climate control system as set forth in claim 1, wherein said vehicle includes an OEM heater valve and said heater valve is connected in series with said OEM heater valve, said OEM heater valve controllable to be fully on when said climate control system is in operation.

3. An installer climate control system as set forth in claim 1, wherein the time during which said heater valve is open or closed is controllable by said climate control system and said microprocessor.

4. An installer climate control system as set forth in claim 2, wherein the time during which said heater valve is open or closed is controllable by said climate control system and such microprocessor.

5. An installer climate control system as set forth in claim 1, wherein said climate control system comprises a manual override state, said heater valve being set to be normally open to ensure that if said climate control system fails and said manual override condition is activated, coolant can flow into said heater core to control the temperature in the passenger compartment.

6. An installer climate control system as set forth in claim 2, wherein said climate control system comprises a manual override state, said heater valve being set to be normally open to ensure that if said climate control system fails and said manual override condition is activated, coolant can flow into said heater core to control the temperature in the passenger compartment.

7. An installer climate control system as set forth in claim 3, wherein said climate control system comprises a manual override state, said heater valve being set to be normally open to ensure that if said climate control system fails and said manual override condition is activated, coolant can flow into said heater core to control the temperature in the passenger compartment.

8. An installer climate control system as set forth in claim 1, wherein said control module comprises a display, said display connected with said microprocessor to control the climate control system.

9. An installer climate control system as set forth in claim 1, wherein said vehicle comprises a water cooled motor.

10. An installer climate control system as set forth in claim 1, wherein said climate control system comprises means to mount said control module within easy view and reach of the driver.

11. An installer climate control system as set forth in claim 1, wherein said microprocessor comprises a closed-loop system to enable said climate control system to reach a desired level.

12. An installer climate control system as set forth in claim 1, wherein said climate control comprises an air conditioning switch electrically connected in parallel with the preexisting air conditioning system in said vehicle.

13. An installer climate control system as set forth in claim 2, wherein said climate control comprises an air conditioning switch electrically connected in parallel with the preexisting air conditioning system in said vehicle.

14. An installer climate control system as set forth in claim 3, wherein said climate control comprises an air conditioning switch electrically connected in parallel with the preexisting air conditioning system in said vehicle.

15. An installer climate control system as set forth in claim 1, wherein said aspirator assembly comprises a thermistor holder, further comprising a fan assembly to draw air through said thermistor holder to average the air temperature sensed and to reduce the response time of said thermistor.

16. An installer climate control system as set forth in claim 2, further comprising a coolant threshold temperature thermostat connected to said microprocessor responsive to elevated coolant temperature to permit heating if required in the passenger compartment.

17. An installer climate control system as set forth in claim 16, further comprising means to prevent the fan in the vehicle from operating to blow air until coolant threshold temperature thermostat is activated.

18. An aftermarket universal installer climate control system for installation in a variety of vehicles having preexisting air conditioning and heating systems and having a heater core into which coolant flows to control heat in the passenger compartment, said climate control system comprising:

a control module adapted to be mounted in the passenger compartment to be accessible to a driver of the vehicle for easy operation,     a power module electrically connected to the control module, said power module comprising a microprocessor to control the cooling and heating systems to climate control the passenger compartment of the vehicle,     an aspirator assembly located proximate to the passenger compartment to determine the temperature in the passenger compartment,     and at least one heater valve adapted to be connected in the supply line to the heater core to regulate the flow of coolant to the heater core,     said vehicle including an OEM heater valve and said heater valve being connected in series with said OEM heater valve, said OEM heater valve controllable to be fully on when said climate control system is in operation.

* * * * *